US011502543B2

(12) United States Patent
Hui et al.

(10) Patent No.: US 11,502,543 B2
(45) Date of Patent: Nov. 15, 2022

(54) BALL AND SOCKET WIRELESS POWER TRANSFER SYSTEMS

(71) Applicant: THE UNIVERSITY OF HONG KONG, Hong Kong (CN)

(72) Inventors: Shu Yuen Ron Hui, Hong Kong (CN); Cheng Zhang, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 27 days.

(21) Appl. No.: 16/347,748

(22) PCT Filed: Nov. 18, 2016

(86) PCT No.: PCT/CN2016/106366
§ 371 (c)(1),
(2) Date: May 6, 2019

(87) PCT Pub. No.: WO2018/090318
PCT Pub. Date: May 24, 2018

(65) Prior Publication Data
US 2019/0319487 A1    Oct. 17, 2019

(51) Int. Cl.
| H01F 27/42 | (2006.01) |
| H01F 37/00 | (2006.01) |
| H01F 38/00 | (2006.01) |
| H02J 50/10 | (2016.01) |
| H02J 50/90 | (2016.01) |
| H02J 50/05 | (2016.01) |

(52) U.S. Cl.
CPC .............. *H02J 50/10* (2016.02); *H02J 50/05* (2016.02); *H02J 50/90* (2016.02)

(58) Field of Classification Search
CPC . H02J 5/005; H02J 7/025; H02J 17/00; H01F 38/14; B60L 11/182
USPC ......................................................... 307/104
See application file for complete search history.

(56) References Cited

U.S. PATENT DOCUMENTS

| 1,119,732 A | 12/1914 | Tesla | |
| 6,352,227 B1* | 3/2002 | Hathaway | F16M 11/14 248/160 |
| 7,576,514 B2 | 8/2009 | Hui | |

(Continued)

FOREIGN PATENT DOCUMENTS

| CN | 203434708 U | 2/2014 |
| CN | 104267831 A | 1/2015 |
| CN | 105846552 A | 8/2016 |

OTHER PUBLICATIONS

Schuder, J.C. et al., "High-Level Electromagnetic Energy Transfer Through A Closed Chest Wall", *IRE Int. Conv. Rec.*, 1961, 9(9):119-126.

(Continued)

*Primary Examiner* — Quan Tra
(74) *Attorney, Agent, or Firm* — Saliwanchik, Lloyd & Eisenschenk

(57) ABSTRACT

Methods, apparatuses, and systems for wireless power transfer (WPT) in ball-and-socket type structures are provided. A ball and ball-socket structure can include conductive windings and conductive plates having a variety of shapes to optimize WPT over different angles as the ball moves or rotates within the ball-socket. One or both of capacitive coupling and inductive coupling can be incorporated.

8 Claims, 13 Drawing Sheets

(56) References Cited

U.S. PATENT DOCUMENTS

| | | | |
|---|---|---|---|
| 8,487,479 B2 | 7/2013 | Cook et al. | |
| 9,780,573 B2* | 10/2017 | McCauley | H01F 38/14 |
| 9,989,100 B1* | 6/2018 | MacDonald | F16D 3/2057 |
| 10,589,162 B2* | 3/2020 | Koo | A63B 57/00 |
| 2008/0308755 A1* | 12/2008 | Hashizume | H04M 1/0216 |
| | | | 250/553 |
| 2013/0127253 A1 | 5/2013 | Stark et al. | |
| 2017/0339343 A1* | 11/2017 | Zhang | H04N 5/2258 |
| 2019/0097472 A1* | 3/2019 | Mishriki | H04B 5/0081 |

OTHER PUBLICATIONS

Ko, W.H. et al., "Design of radio-frequency powered coils for implant instruments", *Medical & Biological Engineering & Computing*, Nov. 1977, 15:634-640.

Hochmair, E.S., "System Optimization for Improved Accuracy in Transcutaneous Signal and Power Transmission", *IEEE Transactions on Biomedical Engineering*, Feb. 1984, BME-31(2):177-186.

Choi, B. et al., "Design and Implementation of Low-Profile Contactless Battery Charger Using Planar Printed Circuit Board Windings as Energy Transfer Device", *IEEE Transactions on Industrial Electronics*, Feb. 2004, 51(1):140-147, IEEE.

Jang, Y. et al., "A Contactless Electrical Energy Transmission System for Portable-Telephone Battery Chargers", *IEEE Transactions on Industrial Electronics*, Jun. 2003, 50(3):520-527, IEEE.

Hurley, W.G. et al., "Induction Heating of Circular Ferromagnetic Plates", *IEEE Transactions on Magnetics*, Jul. 1979, MAG-15(3):1174-1181, IEEE.

Green, A.W. et al., "10kHz Inductively Coupled Power Transfer—Concept and Control", *Power Electronics and Variable-Speed Drives*, Oct. 26-28, 1994, Conference Publication No. 399, pp. 694-699, IEE.

Boys, J.T. et al., "Stability and control of inductively coupled power transfer systems", *IEE Proc. Electric Power Applications*, Jan. 2000, 147(1):37-43, IEE.

Boys, J.T. et al., "Critical Q analysis of a current-fed resonant converter for ICPT applications", *Electronic Letters*, Aug. 17, 2000, 36(17):1440-1442, IEE.

Elliott, G.A.J. et al., "A New Concept: Asymmetrical Pick-Ups for Inductively Coupled Power Transfer Monorail Systems", *IEEE Transactions on Magnetics*, Oct. 2006, 42(10):3389-3391, IEEE.

Kissin, M.L.G. et al., "Interphase Mutual Inductance in Polyphase Inductive Power Transfer Systems", *IEEE Transactions on Industrial Electronics*, Jul. 2009, 56(7):2393-2400, IEEE.

Kim, C.G. et al., "Design of a Contactless Battery Charger for Cellular Phone", *IEEE Transactions on Industrial Electronics*, Dec. 2001, 48(6):1238-1247, IEEE.

Hui, S.Y.R. et al., "A New Generation of Universal Contactless Battery Charging Platform for Portable Consumer Electronic Equipment", *IEEE Transactions on Power Electronics*, May 2005, 20(3):620-627, IEEE.

Liu, X. et al., "Simulation Study and Experimental Verification of a Universal Contactless Battery Charging Platform With Localized Charging Features", *IEEE Transactions on Power Electronics*, Nov. 2007, 22(6):2202-2210, IEEE.

Son, Y. et al., "The Electric Variable Transmission without Slip Ring for the Hybrid Electric Vehicle Driving Structure", *9th International Conference on Power Electronics—ECCE Asia*, Jun. 1-5, 2015, 63 Convention Center, Seoul, Korea, pp. 857-862, KIPE.

Eskelinen, P. "Experimental Rotary Transformers For Antenna Power Supplies and Control", *IEEE Antennas and Propagation Magazine*, Oct. 2010, 52(5):164-167.

International Search Report dated Aug. 9, 2017 in International Application No. PCT/CN2016/106366.

* cited by examiner

Surface Lower
Hemisphere

Surface Upper
Hemisphere

Internal Planar
on the Equator

Internal Other

Surface Other

Planar on the
Equator

Surface
Hemisphere

Surface Other

Others

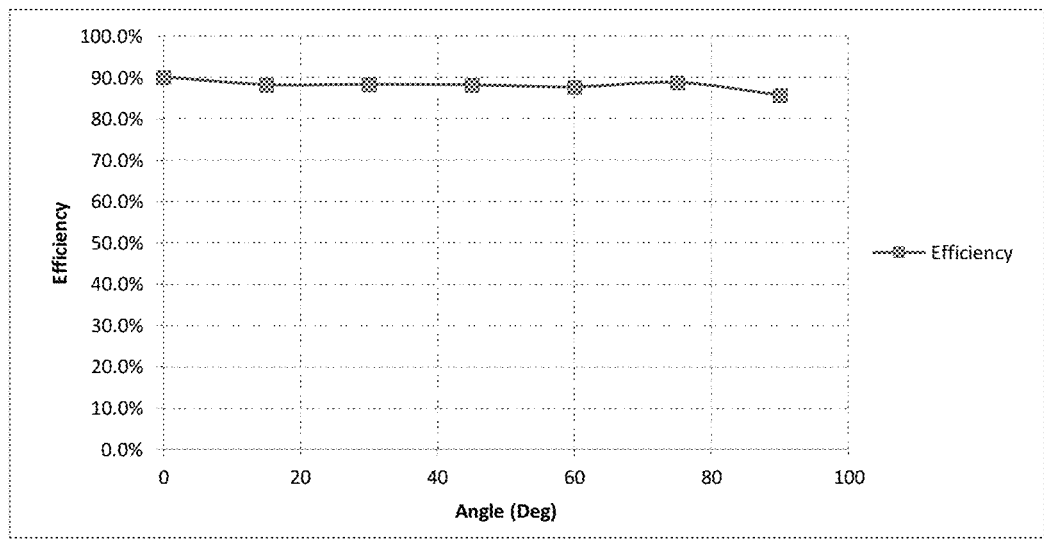
Figure 18
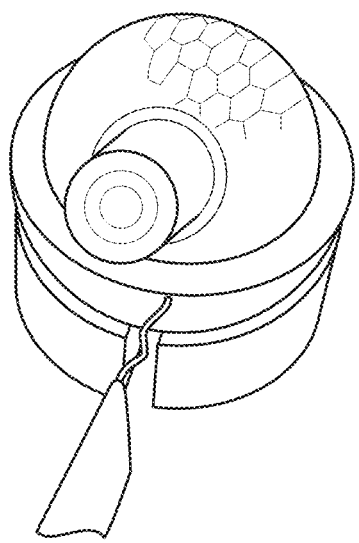 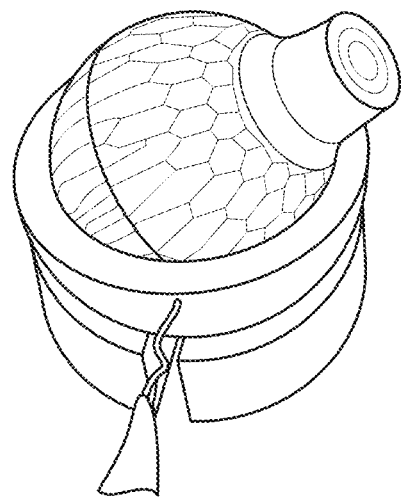
Figure 19A            Figure 19B

BALL AND SOCKET WIRELESS POWER TRANSFER SYSTEMS

CROSS-REFERENCE TO RELATED APPLICATION

This application is the U.S. national stage application of International Patent Application No. PCT/CN2016/106366, filed Nov. 18, 2016, the disclosure of which is incorporated herein by reference in its entirety.

BACKGROUND OF THE INVENTION

Wireless power transfer based on the magnetic resonance and near-field coupling of two loop resonators was reported by Nicola Tesla a century ago. As pioneered by Tesla, wireless power transfer (WPT) can be radiative or non-radiative depending on the energy transfer mechanisms. Radiative power can be emitted from an antenna and propagate through a medium (such as a vacuum or air) over long distances (i.e., distances much larger than the dimensions of the antenna) in the form of electromagnetic waves. However, due to the omni-directional nature of radiative power emission, the energy transfer efficiency is very low. Non-radiative WPT relies on the near-field magnetic coupling of conductive loops and can be applied in short-range and mid-range contexts, when the transmission distance between the power source and the load is greater than the dimensions of the coil-resonators.

WPT has been an active research topic for transcutaneous energy systems for medical implants since the 1960's and for induction heaters since the 1970's. For modern short-range applications, inductive power transfer (IPT) systems and wireless charging systems for portable equipment such as mobile phones have attracted much attention. Wireless charging technology for portable electronic devices has reached the commercialization stage through the launch of the "Qi" Standard by the Wireless Power Consortium, now comprising over 200 companies worldwide.

BRIEF SUMMARY

In spite of the developments in the field of wireless power transfer (WPT), there is still a need for new ways to apply WPT and make it more efficient. Embodiments of the present invention seek to address one or more of these issues and advance the field of wireless power transfer.

Embodiments of the present invention include methods, apparatuses, and systems for wireless power transfer (WPT). More specifically, embodiments of the present invention include methods, apparatuses, and systems for WPT in ball-and-socket type structures. Embodiments of the present invention can incorporate capacitive coupling, inductive coupling, or both.

A ball-and-socket joint consists of a rod attached to a ball and a ball-socket that accommodates the ball structure. The ball structure can move over a wide range of angles inside the ball-socket. Embodiments of the present invention include incorporating WPT transmitter and receiver structures within the ball and ball-socket structures. A WPT transmitter or receiver can be located within the ball structure, including the ball and rod. Likewise, a WPT transmitter or receiver can be located within the ball-socket structure, including the ball-socket and its rod or base.

In an embodiment of the present invention, at least one winding can be fit into the ball structure and at least one winding can be fit into the ball-socket structure. Either winding can be used for wireless power transmission and reception so that bidirectional wireless power flow is possible. The transmitter winding and the receiver winding should be electrically isolated. The transmitter coil and the receiver coil can send and receive power over a wide variety of angles while maintaining high power transfer efficiency. Furthermore, the nature of the ball and socket joint allows for rotation (in addition to angular movement) of the ball structure within the ball-socket, without interruption of wireless power transfer.

Wireless power can be transferred between the ball structure and the ball-socket structure through inductive coupling, magnetic resonance, and capacitive coupling. In embodiments of the present invention that apply capacitive WPT, conductive plates can be used instead of windings. Embodiments of the present invention can also transfer data, in addition to power, via the capacitive or inductive coupling.

Potential applications of the present invention include robotic arms, desk lamps, and other moving and hinged structures in which electric power needs to be transferred. The load connected to the power receiving element can be a direct load, power can be transferred to electric circuitry that regulates the received power, and power can be transferred to electric circuitry that charges a battery or other power storage medium. In one aspect, this invention improves upon the prior art by eliminating the need for conductive wires, which can fail after repetitive bending and movement.

BRIEF DESCRIPTION OF THE DRAWINGS

FIG. 18 is a graph of energy transfer efficiency versus displacement angle for the WPT system shown in FIG. 17B.

FIGS. 19(A) and 19(B) are images of a ball and socket WPT system, according to an embodiment of the present, as applied to an adjustable angle light-emitting diode that is shown in two different positions.

DETAILED DESCRIPTION

Embodiments of the present invention include WPT methods, apparatuses, and systems that can applied to ball-and-socket joints. Embodiments of the present can incorporate magnetic induction, magnetic resonance, and capacitive coupling.

Figure 1:
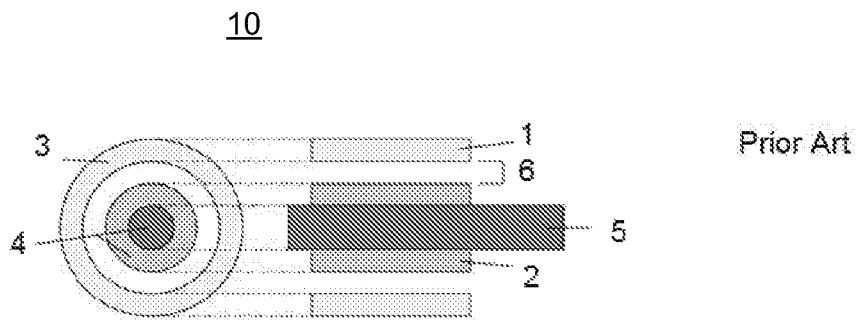
FIG. 1 is an illustration of a primary and secondary winding arrangement in a slip-ring structure.

The prior art teaches some techniques for applying WPT to mechanical structures. For example, a mechanical slip-ring 10 with primary 1 and secondary 2 windings on the fixed 3 and rotating parts 4 is shown in FIG. 1. The primary winding 1 is wound on the stationary (fixed) part 3 of the machine. The secondary winding 2 is wound on the motor shaft 5, which can rotate. An air gap 6 is present between the primary winding 1 and secondary winding 2. Note that the primary winding 1 and the seconding winding 2 share the same axis, and this axis is fixed. In this slip-ring arrangement, the relative positions of the primary 1 and secondary windings 2 remain the same regardless of the rotating speed of the motor shaft 5.

Figure 2:
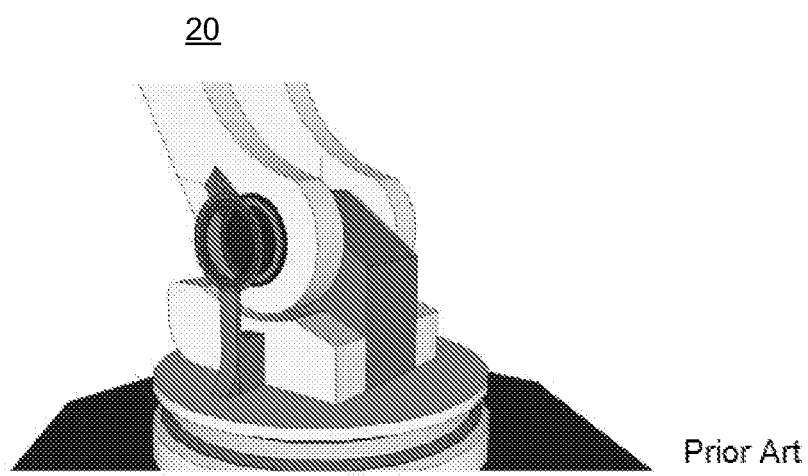
FIG. 2 is an illustration of two co-axial windings in a slip-ring structure for wireless power transfer.
Figure 3:
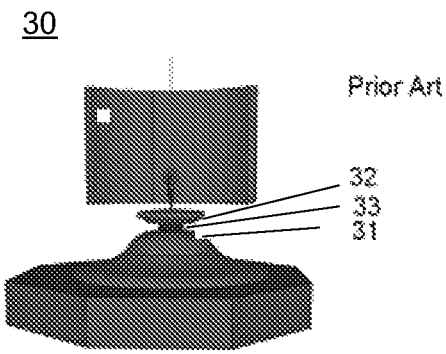
FIG. 3 is an illustration of two co-axial windings for wireless power transfer in a radar system.

FIG. 2 illustrates a second example of WPT systems of the prior art and includes a rotatory transformer 20 with the transmitter and receiver windings placed on two sides of a rotating mechanical structure, which also share the same rotational axis. Like the example of FIG. 1, the two windings are fixed co-axially (i.e., they share the same axis and their axes cannot change relative to each other). Similar ideas can be applied to rotating systems, such as the radar system 30 shown in FIG. 3. The radar system 30 in FIG. 3 includes a rotating shaft 33, as well as a coaxial primary winding 31 and a secondary winding 32 that are mounted on the stationary and rotating sides of a radar system 30, respectively.

Figure 4A:
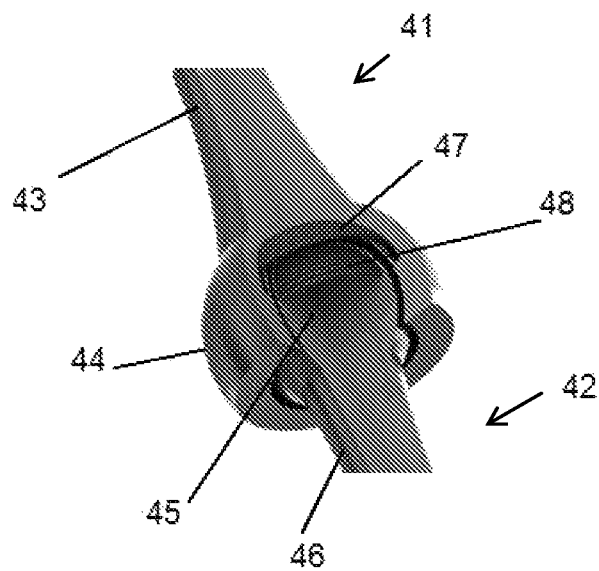
FIG. 4A is an illustration of a WPT ball-and-socket joint according the present invention (with the windings in the ball structure and ball-socket structure exposed for illustration).
Figure 4B:
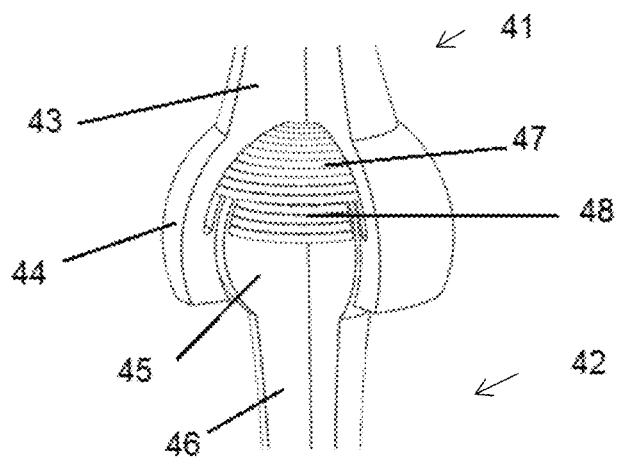
FIG. 4B is an illustration highlighting the windings embedded in the ball structure and the ball-socket structure of an inductive ball and socket WPT system according to an embodiment of the present invention.

FIGS. 4A and 4B show examples of ball- and socket WPT systems according to an embodiment of the present invention. FIGS. 4A and 4B show a ball structure 42 and a ball-socket structure 41. The ball structure 42 includes a ball rod 46 connected to a ball 45 and a first conductive winding 48. The socket structure 41 includes a ball-socket 44 connected to a socket rod 43 and a second conductive winding 47. The ball 45 is located within the ball-socket 44 forming a smooth interface, which allows for movement in all directions as well as rotation. Materials that can be used include metals, plastics, silicon based materials, and ceramics, and lubricants can be provided within the ball-socket joint to further reduce friction.

FIGS. 5(A) through 5(E) show examples of different conductive windings that can be embedded within ball structures of the present invention. FIGS. 6(A) through 6(D) show examples of conductive windings that can be embedded within ball-socket structures according to the present invention. In FIGS. 5(A) to 5(E) and 6(A) to 6(D), a "cross" (X) refers to current entering the plane and a "dot" ( ) refers to current coming out of the plane. However, for inductive power transfer (IPT), high-frequency alternating current (AC) will flow through the windings and the current direction will alternative.

Figure 5A:
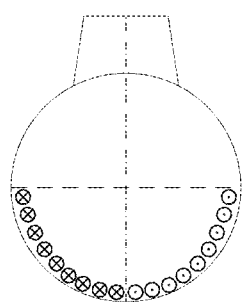
FIGS. 5(A) through 5(E) show several examples of WPT windings embedded within ball structures according to the present invention.
Figure 5B:
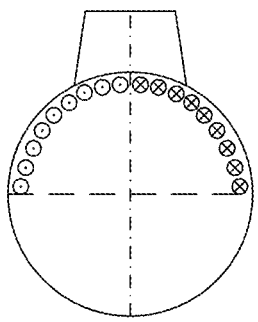
Figure 5C:
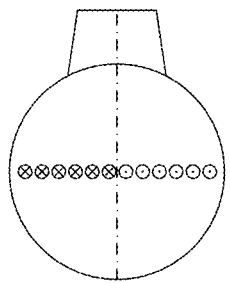
Figure 5D:
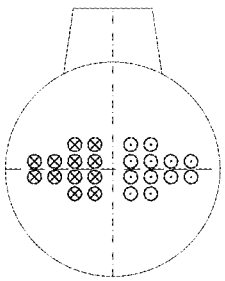
Figure 5E:
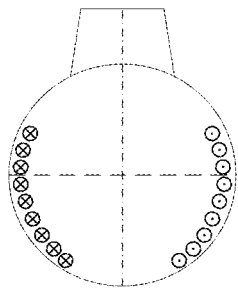

FIG. 5(A) shows a ball structure having conductive windings embedded near the surface of the lower hemisphere of the ball (opposite the ball rod). FIG. 5(B) shows conductive windings embedded on the upper hemisphere of the ball. FIG. 5(C) shows conductive windings formed in a circular fashion on the equatorial plane of the ball (on the plane that is perpendicular to the ball-rod). FIG. 5(D) shows another example of internal winding placement within the rod, wherein the windings wrap around the axis of the ball-rod, are stacked vertically and horizontally, yet do not extend all the way to the top and side surfaces of the ball. FIG. 5(E) shows another example of surface windings of the ball. As seen in FIG. 5(E), windings can begin at the equatorial plane of the ball and extend upwards and downwards from the equatorial plane (e.g., 10, 20, 30, 40, 50, 60, 70, and 80 degrees upwards, downwards, or both upwards and downwards from the equatorial plane), yet not reach the top or bottom of the ball. Embodiments of the present invention can also include additional winding structures to those shown in FIGS. 5(A) to 5(E), including combinations of the winding structures of FIGS. 5(A) to 5(E).

Figure 6A:
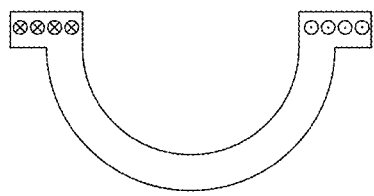
FIGS. 6(A) through 6(D) show several examples of WPT windings embedded within ball-socket structures according to the present invention.
Figure 6B:
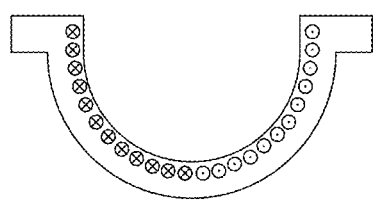
Figure 6C:
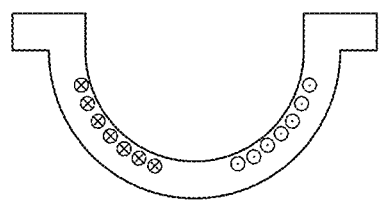
Figure 6D:
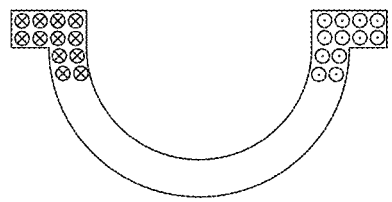

FIGS. 6(A) to 6(D) show several examples of how windings can be incorporated in socket-structures of the present invention. FIG. 6(A) shows windings placed equatorially on a ledge of the ball-socket. FIG. 6(B) shows windings placed just below the inner surface of the bottom hemisphere of the ball-socket. FIG. 6(C) shows an embodiment in which windings are placed near the surface of the ball-socket, without the windings extending all the way to the equator or bottom of the ball-socket. FIG. 6(D) shows another example in which conductive windings are placed on the ledge of ball socket and extend partially into the ball-socket itself. Embodiments of the present invention can also include additional winding structures to those shown in FIGS. 6(A) to 6(D), including combinations of the winding structures of FIGS. 6(A) to 6(D). Again, the windings embedded within the ball structure and ball-socket structure can be used as both transmitter and receiver coils in the present invention, allowing for bi-directional power flow.

According to an embodiment of the present invention, an apparatus for wireless power transfer can include a ball including a first conductive winding and a ball-socket including a second conductive winding. The first conductive winding should be electrically isolated from the second conductive winding.

The first conductive winding and the second conductive winding can each take the shape of one or more parts of a surface of a sphere. For example, the first conductive winding and second conductive winding can each take the shape of a hemisphere, part of a hemisphere, a band formed along a sphere, two bands formed along a sphere, three (or four, five, or six . . . ) bands formed along a sphere, a sphere cap and one or more bands, two or more concentric spherical bands, and concentric hemispheres.

A sphere can be defined has having a top (away from the socket opening or towards the rod) at 90 degrees and a bottom at −90 degrees, wherein the equatorial line is 0 degrees. Each of the bands or parts of the sphere can span a range having any of the following values as endpoints (with or without "about" in front of one or both of the endpoints), though embodiments are not limited thereto (all numerical values are in degrees): 0, 5, 10, 15, 20, 25, 30, 35, 40, 45, 50, 55, 60, 65, 70, 75, 80, 85, 90, −5, −10, −15, −20, −25, −30, −35, −40, −45, −50, −55, −60, −65, −70, −75, −80, −85, and −90. For example, a winding in the shape of a hemisphere can range from 0 degrees to 90 degrees. In a second example, a winding can take the shape of a band on the surface of a sphere extending from 15 to −15 degrees. In a third example, a first band extending from 15 to −15 degrees and having a first radius can be placed within a second band extending from 15 to −15 degrees and having a second radius, which is greater than the first radius. In a fourth example, a winding can include a hemispherical cap extending from 90 to 60 degrees in combination with a band extending from 10 degrees to −10 degrees. In a fifth example, a winding can have a first band extending from 30 degrees to 40 degrees and a second band extending from 10 to 20 degrees.

Figure 13:
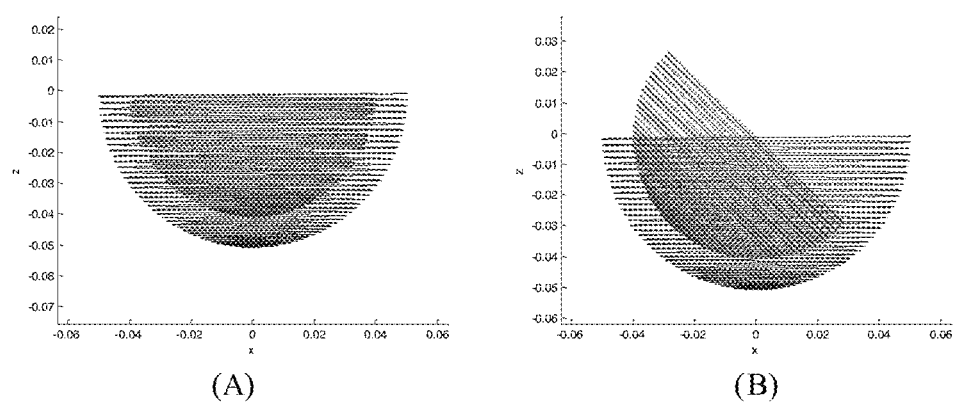
FIG. 13(A) shows the relative position of a transmitter coil (blue) and a receiver coil (red) for $\alpha=0$, $\beta=90°$, $\gamma=0$ and $\delta=90°$ with no displacement angle, according to an embodiment of the present invention.
FIG. 13(B) shows the relative position of a transmitter coil (blue) and a receiver coil (red) for $\alpha=0$, $\beta=90°$, $\gamma=0$ and $\delta=90°$ with a 45° displacement angle, according to an embodiment of the present invention.

The windings of the ball-socket can be included partially or completely within a ledge of the ball-socket. The winding of the ball and the ball-socket can take the form of complete or partial opposing hemispheres (see FIGS. 15(A) and 15(B)) or complete or partial concentric hemispheres, as shown in FIGS. 13(A) and 13(B). The conductive windings of the ball or ball-socket can also extend into their respective rods or supporting structures. The radius of the sphere and thickness of the conductive windings can be determined based on the size and application of the ball-and-socket joint.

Figure 7:
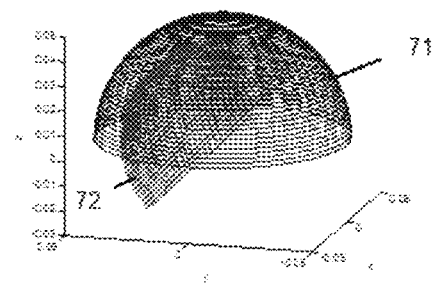
FIG. 7 shows the position of a ball winding (inside) and a ball-socket winding (outside) according to an embodiment of the present invention.

When the ball structure rotates, the axis of the ball winding and the ball-socket winding can point in different directions. One example of this is shown in FIG. 7, wherein the ball-socket windings 71 are shown covering ball windings 72, yet their axes are positioned at different angles.

An investigation will now be had into the scientific principles that underlie the present invention. Certain assumptions will be made to simplify the analysis, such as apparatus dimensions and angular restrictions. However, these assumptions are only made for simplifying the experimental investigation, and it should be clear that embodiments of the present invention are in no way limited by these assumptions.

Figure 8:
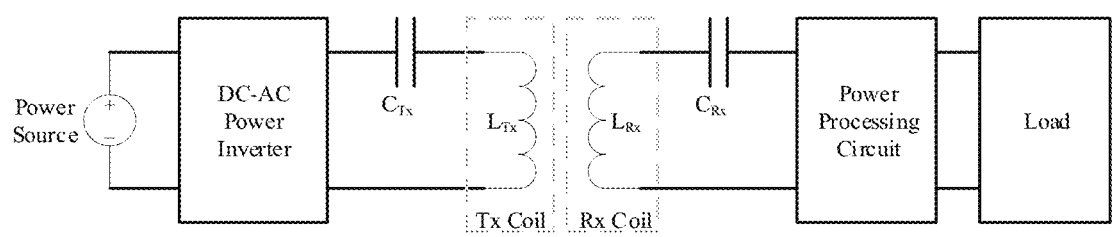
FIG. 8 is an equivalent circuit diagram of a typical WPT system based on inductive coupling and magnetic resonance.

FIG. 8 is an equivalent circuit diagram of a typical WPT system based on inductive coupling and magnetic resonance. A capacitor ($C_{Tx}$ or $C_{Rx}$) is generally used in each coil (inductor) to form a resonant tank because energy transfer efficiency can be increased in WPT systems when they operate at or near their resonance frequency. The power that can be transferred from the transmitter coil to the receiver coil is proportional to the operating frequency, mutual inductance between the transmitter (Tx) and receiver (Rx) coils, and the square of the transmitter coil current:

$$P \propto fMI_{Tx}^2 \qquad (1)$$

where M is the mutual inductance between Tx and Rx coils, f is the operating frequency of the AC source, and $I_T$, is the current of the Tx coil excitation. The currents and voltages in the system can be calculated by the following equation:

$$\begin{bmatrix} R_{Tx} + jX_{Tx} & j\omega M \\ j\omega M & R_{Rx} + jX_{Rx} \end{bmatrix} \begin{bmatrix} I_{Tx} \\ I_{Rx} \end{bmatrix} = \begin{bmatrix} V_{Tx} \\ 0 \end{bmatrix} \qquad (2)$$

where $R_{Tx}$ is the total serial resistance of the transmitter circuit, $X_{TX}$ is the total serial reactance of the transmitter circuit and is equal to $$\omega L_{Tx} = \frac{1}{\omega G_{Tx}}$$

if the compensating capacitor is serially connected as illustrated in FIG. 8. $R_{Rx}$ and $X_{Rx}$ are the parameters for the receiver circuit, M is the mutual inductance between Tx and Rx coils, $I_{Tx}$ and $I_{Rx}$ are the currents flowing through the transmitter and receiver circuits, and $V_{Tx}$ is the AC voltage applied to the transmitter circuit. Instead of windings in the ball structure and ball-socket structure, two conductive plates can be used to form a capacitor and WPT can be achieved through capacitive coupling.

Figure 9A:
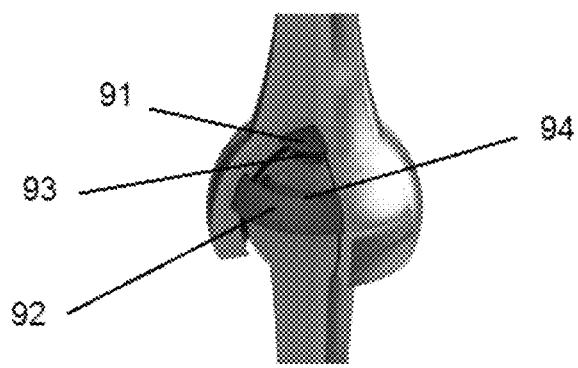
FIG. 9A is an illustration of a ball and socket WPT system based on capacitive coupling, according to an embodiment of the present invention (showing exposed views of conductive plates on the ball structure and the ball-socket structure).
Figure 9B:
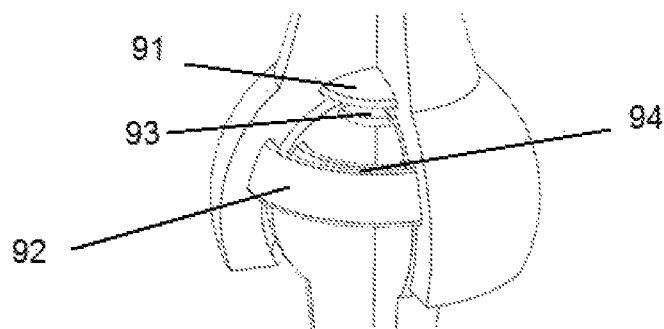
FIG. 9B is a diagram of a ball and socket WPT system based on capacitive coupling (showing the exposed views of the conductive plates on the ball structure and the ball-socket structure).
Figure 10:
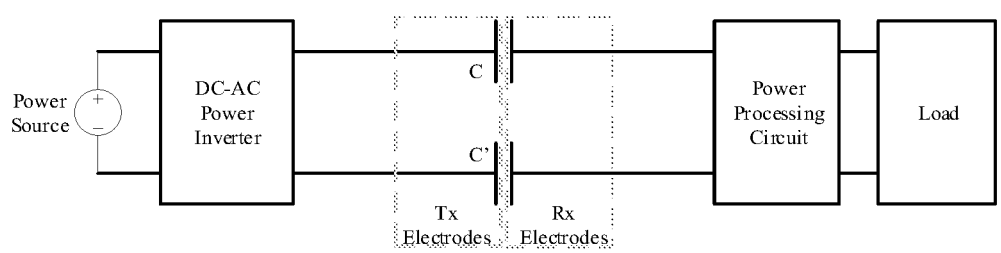
FIG. 10 is an equivalent circuit diagram of a typical WPT system based on capacitive coupling.

FIGS. 9A and 9B show illustrations of a ball-and-socket WPT apparatus that incorporates capacitive coupling. FIGS. 9A and 9B have cutaways so that the ball-socket structure conductive plates 91 and 92 and the ball structure conductive plates 93 and 94 can be seen. That is, embodiments of the present invention can include an upper ball-socket structure conductive plate 91, a bottom ball-socket structure conductive plate 92, an upper ball structure conductive plate 93, and a bottom ball structure conductive plate 94. An equivalent circuit of a capacitive WPT system, such as those of FIGS. 9A and 9B, is shown in FIG. 10. The conductive plates can be made of copper, aluminum or other metals or alloys with low resistance.

A first conductive plate (which can have multiple distinct parts) can be located in the ball, and a second conductive plate (which can have multiple distinct parts) can be located in the ball-socket. The first conductive plate and the second conductive plate can each take the shape of one or more parts of a surface of a sphere. For example, the first conductive plate and second conductive plate can each take the shape of the surface of a hemisphere, part of a hemisphere, a band formed along a sphere, two bands formed along a sphere, three (or four, five, or six . . . ) bands formed along a sphere, a sphere cap and one or more bands, two or more concentric spherical bands, and concentric hemispheres.

A sphere can be defined has having a top (away from the socket opening or towards the rod) at 90 degrees and a bottom at −90 degrees, wherein the equatorial line is at 0 degrees. Each of the bands or parts on the surface of the sphere can span a range of angles, for example, having any of the following values as endpoints (with or without "about" in front of one or both of the endpoints), though embodiments are not limited thereto (all numerical values are in degrees): 0, 5, 10, 15, 20, 25, 30, 35, 40, 45, 50, 55, 60, 65, 70, 75, 80, 85, 90, −5, −10, −15, −20, −25, −30, −35, −40, −45, −50, −55, −60, −65, −70, −75, −80, −85, and −90. For example, a plate in the shape of a hemisphere surface can range from 0 to 90 degrees. In a second example, a plate can take the shape of a band on the surface of a sphere extending from 15 to −15 degrees. In a third example, a first band extending from 15 to −15 degrees and having a first radius can be placed within a second band extending from 15 to −15 degrees and having a second radius, which is greater than the first radius. In a fourth example, a plate can include a hemispherical cap extending from 90 to 70 degrees in combination with a band extending from 10 degrees to 30 degrees, similar to what is shown in FIGS. 9A and 9B. In a fifth example, a plate can have a first band extending from 30 degrees to 40 degrees and a second band extending from 10 to 20 degrees.

The plate of the ball-socket can be included partially or completely within a ledge of the ball-socket. The plate of the ball and the ball-socket can take the form of complete or partial opposing hemispheres (see FIGS. 15(A) and 15(B)) or complete or partial concentric hemispheres, as shown in FIGS. 13(A) and 13(B). The conductive plates of the ball or ball-socket can also extend into their respective rods or supporting structures. The radius of the sphere and thickness of the plates can be determined based on the application of the ball-and-socket joint.

The power stored via capacitance that is transferrable is:

$$P \propto fCV_{Tx}^2, \quad (3)$$

where C is the capacitance between the Tx and Rx electrodes, and $V_{Tx}$ is the AC voltage applied on the Tx electrodes. For planar electrodes, the capacitance can be calculated by the following equation.

$$C = \frac{\varepsilon A}{d} \quad (4)$$

In order to maximize the capacitance for capacitive WPT, the distance (d) between the conductive layer in the ball structure and that in the ball-socket structure should be as small as practically possible, and the overlap area (A) of the transmitter and receiver conductive plates should be as large as possible.

Because inductance is affected by the size, shape, number of windings, and orientation, there can be significant variations in efficiency and power transfer in embodiments of the present invention that rely on IPT. Therefore, winding design should be carefully examined to minimize the fluctuation of mutual inductance between the two windings over a wide angular range. Considering the nature of ball-and-socket joints, the most practical implementation is to wind coils near the surface of both the ball structure and ball-socket structure. The symmetrical winding scheme can be defined by the parameters specified in FIG. 11 and tabulated in Table I.

TABLE I

PARAMETERS OF EMBEDDED COILS IN BALL AND SOCKET

| Parameter | Symbol | Unit |
|---|---|---|
| Cross section radius of the wire | ρ | m |
| Interval between two turns of wire | Δt | m |
| Number of turns | N | |
| Ball winding starting angle | α | deg |
| Ball winding ending angle | β | deg |
| Socket winding starting angle | γ | deg |
| Socket winding ending angle | δ | deg |
| Ball winding radius | $r_b$ | m |
| Socket winding radius | $r_s$ | m |
| Displacement angle between ball and socket | θ | deg |

Figure 11:
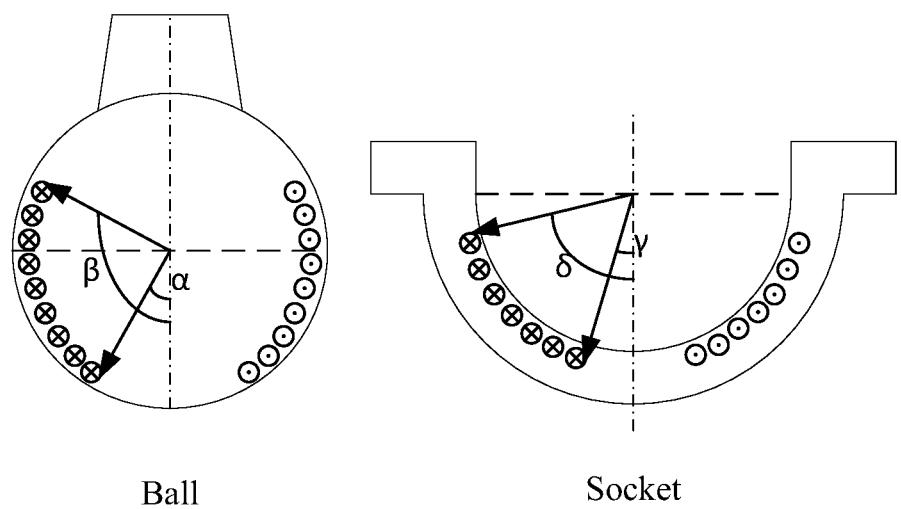
FIG. 11 shows illustrations of winding design with angular variables for optimization.

To produce a simplified model for a basic understanding of the how different factors affect power transfer and efficiency, several assumptions have been made. First, for this investigation, the windings in the ball-socket are assumed not to cover more than a hemisphere (of course, embodiments of the present invention can include more than windings of just a hemisphere). Second, the coils are assumed to be wound symmetrically along the vertical axes, as shown in FIG. 11 (of course, embodiments of the present invention can include windings that are not symmetrical about the vertical axis). Due to the symmetry of the windings, only one displacement angle θ is needed to identify the relative position between the windings of the ball and the ball-socket.

Therefore $$0<\alpha<\beta<180° \quad (5)$$

$$0<\gamma<\delta<90° \quad (6)$$

$$0<\theta<90° \quad (7)$$

where the angular variables α, β, γ and δ are specified as shown in FIG. 11.

Figure 12:
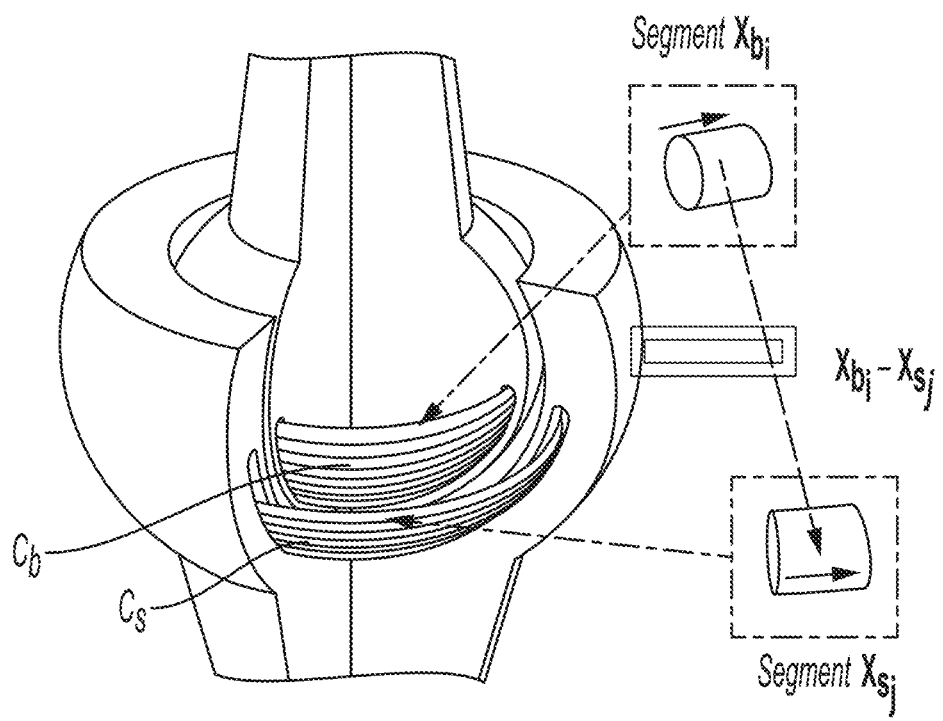
FIG. 12 shows irregular coils used in a ball and socket WPT system (including segment vectors on the ball coil and socket coil), according to an embodiment of the present invention.

Turning to the two coils, the ball coil Cb and socket coil Cs shown in FIG. 12, the windings are irregular. Therefore, it is difficult to derive equations to calculate the self-inductance and mutual-inductance values directly. The calculation can be based on Neumann's formula.

$$L_{m,n} = \frac{\mu_0}{4\pi} \oint_{C_m} \oint_{C_n} \frac{dX_m \cdot dX_n}{X_m - X_n} \quad (8)$$

where $L_{m,n}$ is the inductance between the two general coil m and coil n. Self-inductance is calculated when m=n. $\mu_0$ is the vacuum permeability if no magnetic material is used. $X_m$ and $X_n$ are infinitesimal length vectors along the coil m and n. The denominator in the integral can be approximated as zero when calculating the self-inductance and when $X_m \equiv X_n$. In such situations, special handling techniques are required. The following equation can be used to replace the partial element at the singularity.

$$L_p = \frac{\mu}{2\pi}\left[l \cdot \log\frac{l + \sqrt{l^2 + \rho^2}}{\rho} - \sqrt{l^2 + \rho^2} + \frac{1}{4} + \rho\right] \quad (9)$$

Where $L_p$ is a partial inductance of one segment of coil, 1 equals the length of the discretized vector element of the wire and p is the radius of the cross section of the wire.

The trajectory of the ball coil Cb and socket coil Cs can be generated and stored in vector arrays. Each segment in the array is assumed to have the same length. Thus, the value of $L_p$ is a fixed value.

$$C_b = \{X_{b_1}, X_{b_2}, \ldots, X_{b_n}\} \quad (10)$$

$$C_s = \{X_{s_1}, X_{s_2}, \ldots, X_{s_m}\} \quad (11)$$

When the Neumann's formula (8) is applied to the setup in FIG. 12, mutual-inductance $M_{C_b,C_s}$, between the ball coil $C_b$ and socket coil $C_s$ is the summation of all the partial inductance values:

$$M_{C_b,C_s} = \sum_{i=1}^{n} \sum_{j=1}^{m} \frac{\mu_0}{4\pi} \frac{x_{b_i} \cdot x_{s_j}}{x_{b_i} - x_{s_j}} \quad (12)$$

For the self-inductance of each coil, equation (9) is used to determine one partial inductance value when i=j. The self-inductance equation of each coil $L_C$ is the summation of all the partial inductance value:

$$L_C = \sum_{i=1}^{n} \sum_{j=1}^{m} \begin{cases} \frac{\mu_0}{4\pi} \frac{x_i \cdot x_j}{x_i - x_j} & i \neq j \\ L_p & i = j \end{cases} \quad (13)$$

The general self-inductance equation (13) applies to both ball coil $C_b$, and socket coil $C_s$ in FIG. 12.

With any given mechanical structure of a ball joint, the inner and outer radius is determined. Therefore the optimizable parameters are the four angular variables α, β, γ and δ. Since the equations are complicated, a genetic algorithm was used to find the optimal values of the start and end points of the coils. In order to minimize the variation of mutual inductance over a wide angular movement of the ball structure within the ball-socket, the mutual inductance values were calculated with a series of θ values. Assuming that the mutual inductance values at K different angular positions are obtained, the mean value of the mutual inductance is:

$$\mu_M = \frac{1}{K}(M|_{\theta_1} + M|_{\theta_2} + \ldots + M|_{\theta_K}) \quad (14)$$

The standard deviation of these K inductance values is:

$$SD = \sqrt{\frac{1}{K} \sum_{i=1}^{K} (M|_{\theta_i} - \mu_M)^2} \quad (15)$$

A fitness function is defined as:

$$\text{fitness}(\alpha, \beta, \gamma, \delta) = \frac{\mu_M}{SD} + \mu_M \times 10^{-6} \quad (16)$$

The genetic algorithm that was adopted to optimize the objective function is defined as:

$$J(\alpha,\beta,\gamma,\delta) = \max[\text{fitness}(\alpha,\beta,\gamma,\delta)] \quad (17)$$

Simulations and experiments were carried out to evaluate, optimize, and ultimately determine the physical structure for different embodiments of the present invention. The physical dimensions of the ball joint were determined first. It was assumed that the ball coil radius was 4 cm and the socket coil radius was 5 cm. The cross-sectional radius of the wire was assumed to be 0.75 mm thick. Theta (θ) was selected from 0 to 90°, with 5° intervals. The displacement angles selected were 0,5°,10°,15°, . . . , and 80°, as most practical ball joints will have dead zones. In this study, the windings embedded in the ball-socket were used as the transmitter coil, while the windings embedded in the ball acted as the receiver coil. The ball and ball-socket structures were fabricated using a 3D printer. The rotating angle of the ball structure in the socket was from 0° to about 90°.

FIGS. 13(A) and 13(B) show hemispherical winding in both the ball and ball-socket structures. Specifically, FIG. 13(A) shows the relative position of the transmitter coil (blue) and receiver coil (red) for α=0, β=90°, γ=0 and δ=90° with no displacement angle; and FIG. 13(B) shows the relative position of the transmitter coil (blue) and receiver coil (red) for α=0, β=90°, γ=0 and δ=90° with a 45° displacement angle.

In FIGS. 13(A) and 13(B), the position of the windings embedded in the ball and ball-socket structures can be seen, with each Figure showing a different orientation. The number of turns in the ball structure was $N_{Rx}$=36 (red coil) and that of the ball-socket was $N_{Tx}$=38 (blue coil). The four angular parameters in this standard winding structure is tabulated in Table II.

TABLE II

Parameters for a Set of Standard Windings

| Parameter | Optimal value |
|---|---|
| α | 0 |
| β | 90° |
| γ | 0 |
| δ | 90° |

Figure 14:
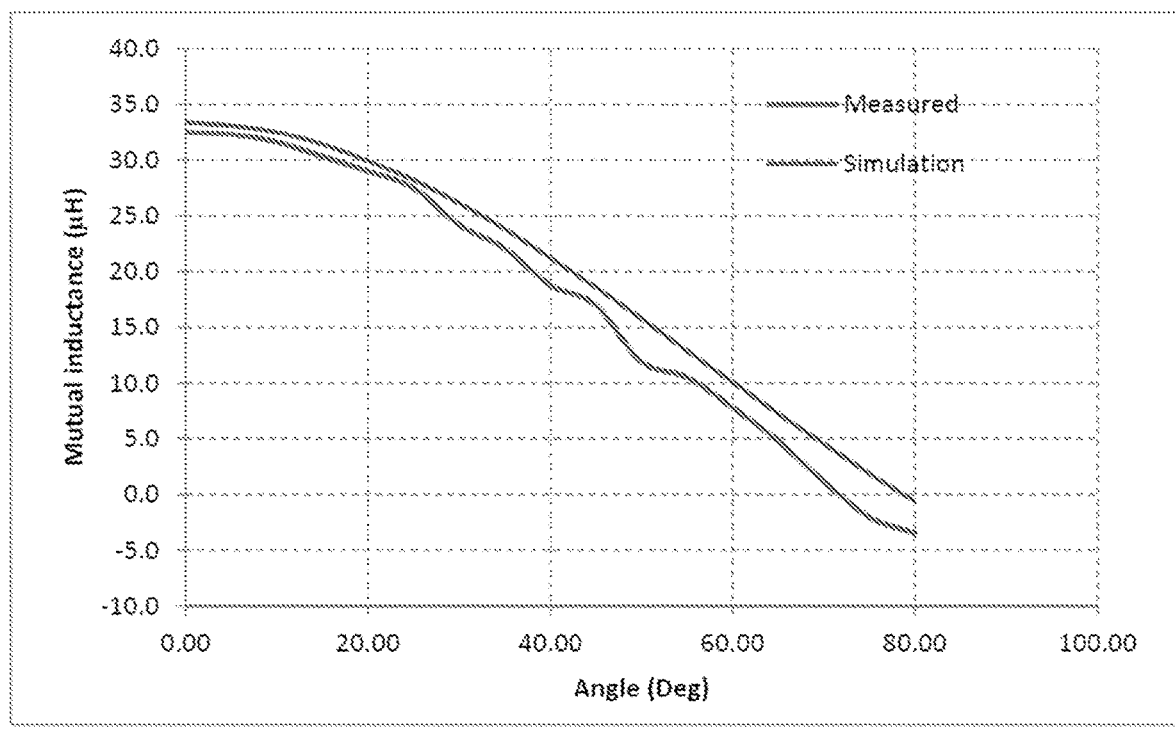
FIG. 14 is a graph of calculated and measured mutual inductance versus displacement angle between the two coils shown in FIGS. 13(A) and 13(B).

Based on the mutual inductance calculations explained above, the mutual inductance values over a wide range of displacement angles were calculated and plotted with the measured values as shown in the graph of FIG. 14. From FIG. 14 it can be seen that the mutual inductance values change substantially (from 33.4 µH to −0.61 µH) when the displacement angle changes from 0 to 80°. While this inductance profile has high inductance values (and thus high energy efficiency in WPT), there is a certain angular range (e.g. from 60° to 80°) in which the inductance values are relatively low.

Figure 15A:
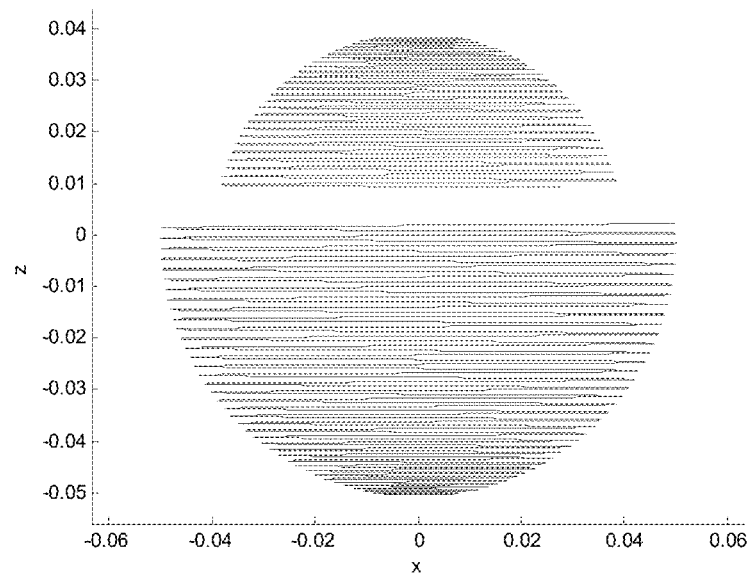
FIG. 15(A) shows the relative position of a transmitter coil (blue) and a receiver coil (red) for $\alpha=104.4°$, $\beta=167.4°$, $\gamma=7.2°$ and $\delta=93.6°$ with no displacement angle, according to an embodiment of the present invention.
Figure 15B:
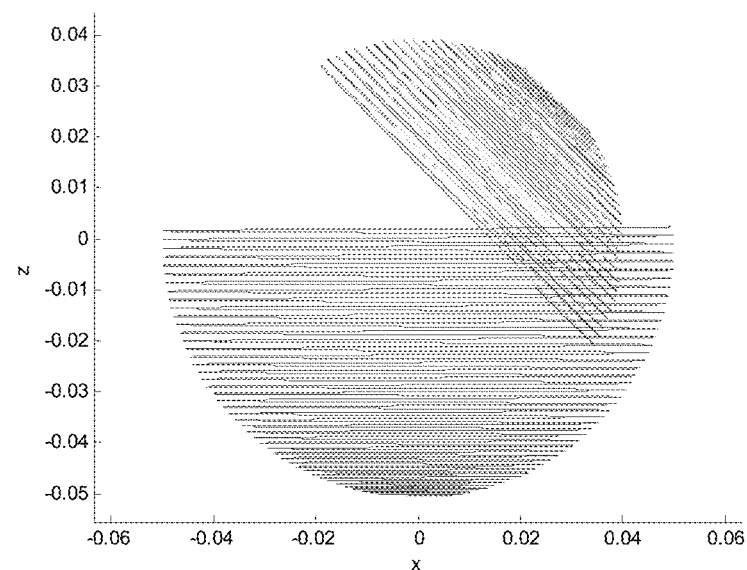
FIG. 15(B) shows the relative positions of the transmitter coil (blue) and receiver coil (red) for $\alpha=104.4°$, $\beta=167.4°$, $\gamma=7.2°$ and $\delta=93.6°$ with a 45° displacement angle, according to an embodiment of the present invention.
Figure 16:
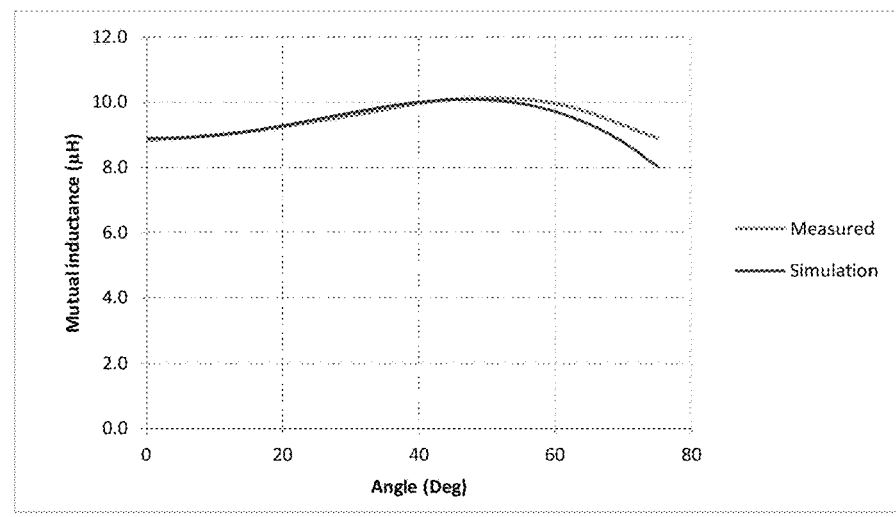
FIG. 16 is a graph of calculated and measured mutual inductance versus displacement angle between the two coils shown in FIGS. 15(A) and 15(B).

A second set of windings, as shown in FIGS. 15(A) and 15(B), were designed to minimize the variation in mutual inductance. As with the previously discussed winding design, $N_{Tx}$=40 (blue coil) and $N_{Rx}$=26 (red coil). For this GA-optimized winding design, the mutual inductance values had much less variation from 0 to 75°. Specifically, the variation only ranged from 10.1 µH to 8.03 µH over a displacement angle range from 0 to 75°. The parameters of this hardware prototype are listed in Table IV. The four optimized parameters of the coil windings have been solved by the GA and are listed in TABLE III. The calculated mutual inductance values and the measured inductance values can be seen in the graph of FIG. 16.

TABLE III

OPTIMIZED PARAMETERS BY GENETIC ALGORITHM

| Parameter | Optimal value |
|---|---|
| α | 104.4° |
| β | 167.4° |
| γ | 7.3° |
| δ | 93.6° |

TABLE IV

PARAMETERS OF THE BALL JOINT

| Parameter | Unit | Value |
|---|---|---|
| Ball coil radius | cm | 4 |
| Socket coil radius | cm | 5 |
| Load impedance | Ohm | 51 |
| Ball coil self-inductance | μH | 27 |
| Socket coil self-inductance | μH | 110 |
| Operating frequency | kHz | 867 |

A 3D-printed ball-and-socket structure according to the present invention was constructed. The coils were wound using a litz wire and the parameters acquired from the optimized results. Both coils were connected in series with compensating capacitors in order to form resonant tanks with resonant frequencies that were identical to the operating frequencies. The receiver at the ball side was connected with an output load 51Ω non-inductive resistor. The power source was a 10 W sinusoidal voltage generator.

Figure 17A:
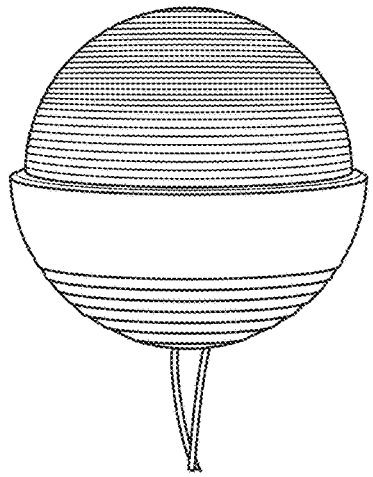
FIG. 17A is a photograph of a conductive winding embedded inside a ball structure of an inductive ball and socket WPT system, according to an embodiment of the present invention.
Figure 17B:
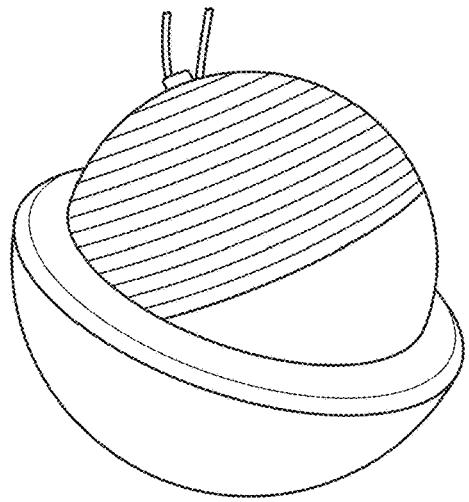
FIG. 17B is a photograph of the ball structure of FIG. 17A housed in a ball-socket structure.

FIG. 17A shows exposed windings inside a ball structure. The exposed ball structure was then covered by a thin outer sheet of material, and the ball structure was placed in the ball-socket structure as shown in FIG. 17B. The energy efficiency was measured for a wide angular range and plotted in the graph of FIG. 18. The results can also be seen in Table V. The energy efficiency stayed above 87% from 0 to 75°. Even at a displacement angle of 90°, a reasonably high energy efficiency of 85.7% was achieved.

TABLE V

MEASURED CURRENT, VOLTAGE AND POWER VALUES AT DIFFERENT DISPLACEMENT ANGLES

| θ (deg) | $V_{in}$ (RMS, V) | $I_{in}$ (RMS, mA) | $P_{in}$ (mW) | $V_{out}$ (RMS, V) | $I_{out}$ (RMS, mA) | $P_{out}$ (mW) | $P_{out}$ (mW) |
|---|---|---|---|---|---|---|---|
| 0 | 2.12 | 99.4 | 202 | 3.12 | 60.0 | 182 | 90.1% |
| 15 | 2.20 | 97.4 | 213 | 3.16 | 61.0 | 188 | 88.3% |
| 30 | 2.38 | 94.5 | 223 | 3.22 | 62.0 | 197 | 88.3% |
| 45 | 2.53 | 92.0 | 229 | 3.26 | 63.4 | 202 | 88.2% |
| 60 | 2.48 | 93.0 | 228 | 3.24 | 63.0 | 200 | 87.7% |
| 75 | 2.08 | 101 | 205 | 3.09 | 60.5 | 182 | 88.8% |
| 90 | 2.11 | 116 | 112 | 2.27 | 45.0 | 96 | 85.7% |

An LED load was used in the receiver for demonstration purposes as shown in FIGS. 19(A) and 19(B). The images of FIGS. 19(A) and 19(B) show that the brightness of the LED load was similar in the two displacement angles.

In another proof of concept experiment, power transfer efficiency was measured for an experimental embodiment of the present invention. The measured power efficiency ranged from 87.1% to 94.4% over a variety of different angles, as can be seen in Table VI. The results recorded in Table VI were obtained using the design shown in FIGS. 15(A) and 15(B) and the actual prototype used to conduct the experiment is shown in FIGS. 17A and 17B. The two axes of the transmitter and receiver coil resonators were used for the relative angle, measured in degrees. When the transmitter and receiver are in-line, the angular position is 0 degrees. The ball structure was then rotated at different angles and the input and output power values were measured, and the energy efficiency values were then calculated.

TABLE VI

Experimental Embodiment Power Transfer Efficiency

| Degree | Vin (RMS) | Iin (RMS) | Pin | Vout (RMS) | Iout (RMS) | Pout | Eff |
|---|---|---|---|---|---|---|---|
| 0 | 5.435 | 0.03165 | 0.16985 | 2.028 | 0.07845 | 0.1587 | 93.43% |
| 15 | 5.53 | 0.02980 | 0.16263 | 1.988 | 0.07733 | 0.1535 | 94.39% |
| 30 | 5.56 | 0.02939 | 0.16100 | 1.976 | 0.07692 | 0.1520 | 94.41% |
| 45 | 5.57 | 0.02927 | 0.16090 | 1.975 | 0.07697 | 0.1510 | 93.85% |
| 60 | 5.43 | 0.03230 | 0.17300 | 2.03 | 0.07920 | 0.1600 | 92.49% |
| 75 | 4.98 | 0.04160 | 0.20364 | 2.18 | 0.08500 | 0.1855 | 91.11% |
| 90 | 3.98 | 0.06450 | 0.23300 | 2.28 | 0.08900 | 0.2030 | 87.12% |

The subject invention includes, but is not limited to, the following exemplified embodiments.

Embodiment 1. An apparatus for wireless power transfer comprising:
　a ball including a first conductive winding; and
　a ball-socket including a second conductive winding,
　wherein the first conductive winding is electrically isolated from the second conductive winding.

Embodiment 2. The apparatus of Embodiment 1, wherein the first conductive winding takes a shape from one or more parts of a surface of a sphere [e.g., a hemisphere, part of a hemisphere, a band formed along a sphere, two bands formed along a sphere, three (or four, five, or six . . . ) bands formed along a sphere, a sphere cap and one or more bands, two or more concentric spherical bands, and concentric hemispheres].

Embodiment 3. The apparatus of any of Embodiments 1 to 2, wherein the first conductive winding is planar equatorial [e.g., a ring or band around the central axis and on the equatorial plane, a complete planar equatorial winding, or a planar equatorial winding that starts at the center of the ball and only extends partially to the surface of the ball].

Embodiment 4. The apparatus of any of Embodiments 1 to 3, wherein the first conductive winding includes an internal stack (where the windings are vertically stacked, such as that shown in FIG. 5D).

Embodiment 5. The apparatus of any of Embodiments 1 to 4, wherein the first conductive winding takes the shape of an internal saucer (such as that shown in FIG. 5D).

Embodiment 6. The apparatus of any of Embodiments 1 to 5, wherein the second conductive winding takes a shape from one or more parts of a surface of a sphere [e.g., a hemisphere, part of a hemisphere, a band formed along a sphere, two bands formed along a sphere, three (or four, five, or six . . . ) bands formed along a sphere, a sphere cap and one or more bands, two or more concentric spherical bands, and concentric hemispheres].

Embodiment 7. The apparatus of any of Embodiments 1 to 6, wherein the second conductive winding is located partially or completely within a ledge of the ball-socket.

Embodiment 8. The apparatus of any of Embodiments 1 to 7, wherein the first conductive winding and the second conductive winding take the form of opposing hemispheres (or partial spheres; see, e.g., FIGS. 15(A) and 15(B)) or partial opposing hemispheres (or concave and convex hemispheres, as shown in FIGS. 13(A) and 13(B)).

Embodiment 9. The apparatus of any of Embodiments 1 to 8, wherein the first conductive winding extends within a rod attached to the ball (not shown).

Embodiment 10. The apparatus of any of Embodiments 1 to 9, wherein the second conductive winding extends within a rod attached to the ball-socket (not shown).

Embodiment 101. An apparatus for wireless power transfer comprising:
　a ball including a first conductive plate (which can include multiple distinct parts); and
　a ball-socket including a second conductive plate (which can include multiple distinct parts),
　wherein the first conductive plate is electrically isolated from the second conductive plate.

Embodiment 102. The apparatus of Embodiment 101, wherein the first plate takes a shape from one or more parts of a surface of a sphere [e.g., a hemisphere, part of a hemisphere, a band formed along a sphere, two bands formed along a sphere, three (or four, live, or six . . . ) bands formed along a sphere, a sphere cap and one or more bands, two or more concentric spherical bands, and concentric hemispheres].

Embodiment 103. The apparatus of any of Embodiments 101 to 102, wherein the first conductive plate is planar equatorial (e.g., forming an equatorial plate that extends to just below the surface of the ball, or a planar equatorial plate that starts at the center of the ball and only extends partially towards the surface of the ball).

Embodiment 104. The apparatus of any of Embodiments 101 to 103, wherein the first conductive plate includes a stack of plates.

Embodiment 105. The apparatus of any of Embodiments 101 to 104, wherein the first conductive plate takes a shape of an internal saucer.

Embodiment 106. The apparatus of any of Embodiments 101 to 105, wherein the second conductive plate takes a shape from one or more parts of a surface of a sphere [e.g., a hemisphere, part of a hemisphere, a band formed along a sphere, two bands formed along a sphere, three (or four, five, or six . . . ) bands formed along a sphere, a sphere cap and one or more bands, two or more concentric spherical bands, and concentric hemispheres].

Embodiment 107. The apparatus of any of Embodiments 101 to 106, wherein the second conductive plate is located at least partially within a ledge of the ball-socket.

Embodiment 108. The apparatus of any of Embodiments 101 to 107, wherein the first conductive plate and the second conductive plate take the form of opposing hemispheres (or partial spheres; see, e.g., FIGS. 15(A) and 15(B)) or partial opposing hemispheres (or concave and convex hemispheres).

Embodiment 109. The apparatus of any of Embodiments 101 to 108, wherein the first conductive plate extends within a rod attached to the ball (not shown).

Embodiment 110. The apparatus of any of Embodiments 101 to 109, wherein the second conductive plate extends within a rod attached to the ball-socket (not shown).

Embodiment 201. A method for wireless power transfer comprising:
　acquiring or fabricating any of the apparatuses from Embodiment 1 to Embodiment 10;
　applying alternating current to either the first conductive winding or the second conductive winding to transfer power via inductive coupling or magnetic resonance.

Embodiment 202. A method for wireless power transfer comprising:
　acquiring or fabricating any of the apparatuses from Embodiment 101 to Embodiment 110; and
　applying alternating current to either the first conductive winding or the second conductive winding to transfer power via inductive coupling or magnetic resonance.

Embodiment 203. A method for wireless power transfer comprising:
　acquiring or fabricating any of the apparatuses from Embodiment 1 to Embodiment 10; and
　transferring power via capacitive coupling.

Embodiment 204. A method for wireless power transfer comprising:
　acquiring or fabricating any of the apparatuses from Embodiment 101 to Embodiment 110; and
　transferring power via capacitive coupling.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the cextent they are not inconsistent with the explicit teachings of this specification.

REFERENCES

[1] N. Tesla, "Apparatus for transmitting electrical energy," U.S. Pat. No. 1,119,732, Dec. 1, 1914.

[2] Robert Lomas, *The man who invented the twentieth century Nikola Tesla Forgotten Genius of Electricity*. Headline 1999, ISBN 0 7472 6265 9, p. 146.

[3] J. C. Schuder, H. E. Stephenson, and J. F. Townsend, "High level electromagnetic energy transfer through a closed chestwall," *IRE Int. Cony. Rec.*, pt.9, vol. 9, pp. 119-126, 1961.

[4] W. H. Ko, S. P. Liang, and C. D. F. Fung, "Design of rf-powered coils for implant instruments," *Med. Biol. Eng. Comput.*, vol. 15, pp. 634-640, 1977.

[5] E. Hochmair, "System optimization for improved accuracy in transcutaneous signal and power transmission", *IEEE Trans. Biomedical Engineering*, vol. BME-31, no. 2, pp. 177-186, February 1984.

[6] B. Choi, J. Nho, H. Cha, T. Ahn and S. Choi, "Design and implementation of low-profile contactless battery charger using planar printed circuit board windings as energy transfer device," *IEEE Trans. Industrial Electronics*, vol. 51, no. 1, pp. 140-147, February 2004.

[7] Y. Jang and M. M. Jovanovic, "A contactless electrical energy transmission system for portable-telephone battery chargers", *IEEE Trans. Industrial Electronics*, vol. 50, no. 3, pp. 520-527, June 2003.

[8] W. G. Hurley and J. Kassakian, "Induction heating of circular ferromagnetic plates", *IEEE Trans. Magnetics*, vol. 15, no. 4, pp. 1174-1181, July 1979.

[9] A. W. Green and J. T. Boys, "10 kHz inductively coupled power transfer-concept and control", in *Proc. ICPE-VSD*, 1994, pp. 694-699.

[10] J. T. Boys, G. A. Covic and A. W. Green, "Stability and control of inductively coupled power transfer systems", in *Proc. Electric Power Applications,* 2000, vol. 147, no. 1, pp. 37-43.

[11] J. T. Boys, A. P. Hu and G. A. Covic, "Critical Q analysis of a current-fed resonant converter for ICPT applications", *Electronics Letters*, vol. 36, no. 17, pp. 1440-1442, 2000.

[12] G. A. J. Elliott, G. A. Covic, D. Kacprzak and J. T. Boys, "A New Concept: Asymmetrical Pick-Ups for Inductively Coupled Power Transfer Monorail Systems", *IEEE Trans. Magnetics*, vol. 42, no. 10, pp. 3389-3391, 2006.

[13] M. L. G. Kissin, J. T. Boys and G. A. Covic, "Interphase Mutual Inductance in Polyphase Inductive Power Transfer Systems", *IEEE Trans. Industrial Electronics*, vol. 56, no. 7, pp. 2393-2400, 2009.

[14] B. Choi, J. Nho, H. Cha, T. Ahn and S. Choi, "Design and implementation of low-profile contactless battery charger using planar printed circuit board windings as energy transfer device", *IEEE Trans. Industrial Electronics*, vol. 51, no. 1, pp. 140-147, February 2004.

[15] Y. Jang and M. M. Jovanovic, "A contactless electrical energy transmission system for portable-telephone battery chargers", *IEEE Trans. Industrial Electronics*, vol. 50, no. 3, pp. 520-527, June 2003.

[16] C.-G. Kim, D.-H. Seo, J.-S. You, J.-H. Park and B. H. Cho, "Design of a contactless battery charger for cellular phone", *IEEE Trans. Industrial Electronics*, vol. 48, no. 6, pp. 1238-1247, December 2001.

[17] S. Y. R. Hui and W. C. Ho, "A new generation of universal contactless battery charging platform for portable Consumer Electronic equipment", *IEEE Trans. Power Electronics*, vol. 20, no. 3, pp. 620-627, May 2005.

[18] X. Liu and S. Y. R. Hui, "Simulation Study and Experimental Verification of a Contactless Battery Charging Platform with Localized Charging Features" *IEEE Trans. Power Electronics*, vol. 22, no. 6, pp. 2202-2210, November 2007.

[19] S. Y. R. Hui, "Planar Inductive Battery Charging System", U.S. Pat. No. 7,576,514, 2009.

[20] Wireless Power Consortium Website [online]. Available: http://www.wirelesspowerconsortium.com

[21] Yeongrack Son and Jung-Ik Ha, "The Electric Variable Transmission without Slip Ring for the Hybrid Electric Vehicle Driving Structure", 9th International Conference on Power Electronics-ECCE Asia, Jun. 1-5, 2015, Convention Center, Seoul, Korea

[22] Pekka Eskelinen, "Experimental Rotary Transformers For Antenna Power Supplies and Control", IEEE Antennas and Propagation Magazine, Vol. 52, No. 5, October 2010, 165-167

What is claimed is:

1. An apparatus for wireless power transfer comprising:
a ball including a first conductive winding;
a ball-socket disposed around the ball such that the ball is irremovably disposed within the ball-socket, the ball-socket including a second conductive winding;
a ball rod connected to the ball; and
a socket rod connected to the ball-socket,
wherein the first conductive winding is electrically isolated from the second conductive winding,
wherein the first conductive winding extends within the ball rod connected to the ball, and
wherein the first conductive winding and the second conductive winding form opposing complete hemispheres.

2. The apparatus according to claim 1, wherein the ball-socket comprises a ledge extending outwardly therefrom in a direction perpendicular to a direction in which the socket rod extends away from the ball-socket.

3. An apparatus for wireless power transfer comprising:
a ball including a first conductive plate; and
a ball-socket disposed around the ball such that the ball is irremovably disposed within the ball-socket, the ball-socket including a second conductive plate;
a ball rod connected to the ball; and
a socket rod connected to the ball-socket,
wherein the first conductive plate is electrically isolated from the second conductive plate,
wherein the first conductive plate extends within the ball rod connected to the ball, and
wherein the first conductive plate and the second conductive plate form opposing complete hemispheres.

4. The apparatus according to claim 3, wherein the ball-socket comprises a ledge extending outwardly therefrom in a direction perpendicular to a direction in which the socket rod extends away from the ball-socket.

5. A method for wireless power transfer comprising:
acquiring or fabricating an apparatus according to claim 1; and applying alternating current to either the first conductive winding or the second conductive winding to transfer power via inductive coupling or magnetic resonance.

6. A method for wireless power transfer comprising:

acquiring or fabricating an apparatus according to claim 3; and applying alternating current to either the first conductive winding or the second conductive winding to transfer power via inductive coupling or magnetic resonance.

7. A method for wireless power transfer comprising:

acquiring or fabricating an apparatus according to claim 1; and transferring power via capacitive coupling.

8. A method for wireless power transfer comprising:

acquiring or fabricating an apparatus according to claim 3; and transferring power via capacitive coupling.

* * * * *